3,037,987
PURIFICATION OF NICOTINIC ACID
Mitchell F. Zienty, Elkhart, Ind., assignor to Miles Laboratories, Inc., Elkhart, Ind., a corporation of Indiana
No Drawing. Filed Aug. 4, 1958, Ser. No. 753,149
7 Claims. (Cl. 260—295.5)

This invention relates to a process of purifying crude, yellow nicotinic acid to yield a colorless product which meets United States Pharmacopoeia (U.S.P.) specifications.

Most of the nicotinic acid used for vitamin preparations is presently prepared by the oxidation with dilute aqueous nitric acid, at elevated temperatures and pressures, of substituted pyridine compounds having a substituent in the beta-position, such as aldehydine (2-methyl-5-ethyl pyridine), nicotine, beta-picoline, quinoline, and isoquinoline. Of such beta-substituted pyridines, aldehydine is the one most commonly used for the preparation of nicotinic acid because it is inexpensive and its oxidation easily controlled.

Nicotinic acid prepared by the above mentioned process is brilliant yellow in color, and while this color factor does not detract from its value as a component in animal-feed mixes, many expensive and time consuming recrystallizations and char treatments have heretofore been required to convert the crude-yellow acid to the colorless form which will meet U.S.P. specifications.

It is an object of the invention to provide a simple, economical, direct method of purifying to U.S.P. standards crude, yellow nicotinic acid produced by the oxidation of beta-substituted pyridine compounds, such as aldehydine, with nitric acid, which method involves but one recrystallization step, thereby avoiding the expense incurred in carrying out the numerous crystallizations required by the prior art methods.

Other objects and advantages of the invention will become apparent from the description thereof which follows.

My invention, briefly, is based on the unexpected finding that when crude, yellow nicotinic acid produced as aforesaid, is melted and maintained in the molten state for about two minutes or more, the yellow chromophore is destroyed, and the resulting acid, which upon cooling is light tan in color, may be converted to a colorless product of U.S.P. quality by only one recrystallization from a suitable medium.

In practicing the invention, the crude nicotinic acid is preferably heated only to its melting point, or slightly above, e.g., 236° to 250° C., since the removal or destruction of the yellow chromophore progresses satisfactorily at such temperatures. Somewhat higher temperatures may be used, if desired, although the risk of losing nicotinic acid by sublimation increases as the temperature rises. The pressure maintained during the heat treatment of the nicotinic acid is not critical, and may be atmospheric or subatmospheric.

After the nicotinic acid has been maintained in the molten state for the necessary length of time, as defined more fully hereinafter, it will be found upon cooling to solidify as a tan colored mass. This mass is then dissolved in a hot recrystallizing medium, such as water, containing a suitable quantity of a solid decolorizing agent effective to decolorize the resulting solution. The solution is then stirred for a few minutes and filtered to remove the solid decolorizing agent, and the filtrate is cooled to allow the nicotinic acid to separate out as colorless crystals.

Because it is inexpensive and readily available, water is preferred as the crystallizing medium. However, it will be understood that other liquids, such as ethanol, and solutions of water and ethanol, may be used instead for this purpose if desired.

The decolorizing agent which I have found to be eminently satisfactory for use prior to recrystallization of the nicotinic acid is activated carbon, but other suitable solid decolorizing agents may be used for this purpose if desired.

The following examples are illustrative of the present process.

*Example 1*

Twenty-five grams of crude, yellow nicotinic acid produced by the oxidation of aldehydine with nitric acid was melted and maintained in the molten state at a temperature of 235° to 250° C. for about one minute. The melt was cooled to about room temperature and dissolved in 150 ml. of boiling water, and the resulting solution was given a decolorization treatment with 0.5 gram of Darco-G 60 brand activated carbon and filtered. On cooling the solution to about 5° C., 23 grams of yellow nicotinic acid (M.P. 236° C.) separated out. The recovered nicotinic acid showed little or no color improvement over the untreated crude nicotinic acid.

*Example 2*

Twenty-five grams of crude, yellow nicotinic acid produced by the oxidation of aldehydine with nitric acid was melted and maintained in the molten condition at a temperature of 235° to 250° C. for about two minutes. The melt was cooled to about room temperature and dissolved in 250 ml. of boiling water, and the resulting solution was given a decolorization treatment with 0.5 gram of Darco-G 60 brand activated carbon, and filtered. On cooling the filtered solution to about 5° C. the nicotinic acid crystallized out and was recovered by filtration. The recovered nicotinic acid was slightly yellowish in color and weighed 22 grams (M.P. 237° to 238° C.).

*Example 3*

Twenty-five grams of crude, yellow nicotinic acid produced by the oxidation of aldehydine with nitric acid was melted and maintained in the molten condition at a temperature of 235° to 250° C. for about three minutes. The melt was cooled, dissolved in 150 ml. of boiling water, the resulting solution given a decolorization treatment with 0.5 gram of Darco-G 60 brand activated carbon, filtered to remove the activated carbon, and cooled to crystallize the nicotinic acid, as in Example 1. Twenty-three and one-half grams of colorless nicotinic acid was obtained.

*Example 4*

The procedure of Example 3 was repeated, except that the crude nicotinic acid was maintained in the molten condition for about five minutes. About 22.5 grams of colorless nicotinic acid (M.P. 235° to 238° C.) was recovered.

It will be seen from the foregoing examples that, in order to produce a substantially colorless grade of nicotinic acid by the present process, the crude yellow nicotinic acid should be maintained in the molten condition for at least two minutes under the conditions specified.

Maintaining the crude nicotinic acid in molten condition for substantially longer periods than that shown in the above examples to be effective does not improve the final product, and may result in undue loss of nicotinic acid by sublimation.

It will be understood that the invention is of a nature permitting certain modifications of the procedure described above for the purpose of illustration, without departing from the principles thereof.

Having fully described the invention, what I claim as new is:

1. The process of purifying yellow nicotinic acid produced by the oxidation with nitric acid of a substituted pyridine compound having a substituent in the beta-position, which comprises melting said nicotinic acid, maintaining said nicotinic acid in the molten state for at least two minutes, dissolving in a hot recrystallizing medium unsublimed nicotinic acid resulting from the preceding step, decolorizing the resulting solution, and cooling said decolorized solution to recrystallize purified nicotinic acid.

2. The process of purifying yellow nicotinic acid produced by the oxidation of aldehydine with nitric acid, comprising melting said nicotinic acid, maintaining said nicotinic acid in the molten state for about two minutes, dissolving unsublimed nicotinic acid resulting from the preceding step in a hot recrystallizing medium containing a solid decolorizing agent, separating said decolorizing agent from the resulting nicotinic acid solution, and cooling said solution to crystallize purified nicotinic acid.

3. The process of purifying yellow nicotinic acid produced by the oxidation of aldehydine with nitric acid, comprising melting said nicotinic acid, maintaining said nicotinic acid in the molten state for at least two minutes, cooling said molten nicotinic acid below its melting point, dissolving the resulting cooled nicotinic acid in a hot re-crystallizing medium containing a solid decolorizing agent in an amount effective to decolorize the resulting nicotinic acid solution, separating said decolorizing agent from said nicotinic acid solution, and cooling said solution to crystallize purified nicotinic acid.

4. The process of purifying yellow nicotinic acid produced by the oxidation of aldehydine with nitric acid, comprising melting said nicotinic acid, maintaining said nicotinic acid in the molten state for at least two minutes, cooling said molten nicotinic acid below its melting point, dissolving the resulting cooled nicotinic acid in hot water containing a solid decolorizing agent in an amount effective to decolorize the resulting nicotinic acid solution, separating said decolorizing agent from said nicotinic acid solution, and cooling said solution to crystallize purified nicotinic acid.

5. The process of purifying yellow nicotinic acid produced by the oxidation of aldehydine with nitric acid, comprising heating said nicotinic acid at subatmospheric pressure to its melting point, maintaining said nicotinic acid in the molten state at said pressure for at least two minutes, cooling said molten nicotinic acid below its melting point, dissolving the resulting cooled nicotinic acid in a hot recrystallizing medium containing a solid decolorizing agent, separating said decolorizing agent from the resulting nicotinic acid solution, and cooling said solution to crystallize purified nicotinic acid.

6. In a process for decolorizing yellow nicotinic acid produced by the oxidation with nitric acid of a substituted pyridine compound having a substituent in the beta-position, wherein the nicotinic acid is crystallized from a liquid decolorizing medium, the improvement which comprises melting the yellow nicotinic acid and maintaining said nicotinic acid in the molten state for at least two minutes without substantial sublimation prior to said crystallizing step.

7. In a process for decolorizing yellow nicotinic acid produced by the oxidation with nitric acid of a substituted pyridine compound having a substituent in the beta-position, wherein the nicotinic acid is re-crystallized from a liquid recrystallizing medium, the improved which comprises melting the yellow nicotinic acid and maintaining said nicotinic acid in the molten state for at least two minutes, and then recrystallizing the unsublimed nicotinic acid resulting from the melting step.

References Cited in the file of this patent

UNITED STATES PATENTS

| | | |
|---|---|---|
| 2,389,065 | Nutley et al. | Nov. 13, 1945 |
| 2,721,202 | Wirz | Oct. 18, 1955 |
| 2,829,144 | Benner | Apr. 1, 1958 |
| 2,834,768 | Mueller | May 13, 1958 |
| 2,834,786 | Mueller | May 13, 1958 |
| 2,836,601 | Wilbert et al. | May 27, 1958 |
| 2,905,688 | Illich | Sept. 22, 1959 |
| 2,916,494 | O'Brochta | Dec. 8, 1959 |